United States Patent [19]

Buckalew

[11] Patent Number: 4,751,865
[45] Date of Patent: Jun. 21, 1988

[54] SELF GUIDING PORTABLE SAW WITH SAW GUIDE ASSEMBLY

[76] Inventor: Joseph A. Buckalew, 6261 Crescent Ave., Buena Park, Calif. 90620

[21] Appl. No.: 853,008

[22] Filed: Apr. 17, 1986

[51] Int. Cl.⁴ ............................................... B27B 9/04
[52] U.S. Cl. ..................................... 83/745; 83/486.1; 83/574; 83/698
[58] Field of Search ...................... 83/745, 486.1, 486, 83/485, 574, 698

[56] References Cited

U.S. PATENT DOCUMENTS

| | | |
|---|---|---|
| 335,738 | 2/1886 | Booyer . |
| 2,735,455 | 2/1956 | Forsberg . |
| 2,780,501 | 2/1957 | Rosenberg . |
| 2,876,808 | 3/1959 | Lindheim ........................ 83/574 X |
| 2,942,633 | 6/1960 | King . |
| 3,045,724 | 7/1962 | Mitchel . |
| 3,073,360 | 1/1963 | Villanueva ........................ 83/574 |
| 3,454,056 | 7/1969 | Pahlck . |
| 3,869,951 | 3/1975 | Litwin . |
| 3,903,774 | 9/1975 | Stinson . |
| 3,979,987 | 9/1976 | Mayhew et al. .................. 83/745 |
| 3,991,642 | 10/1976 | Girardin . |
| 4,023,273 | 5/1977 | Treleaven . |
| 4,315,494 | 2/1982 | DiPlacido . |
| 4,328,728 | 5/1982 | Ferdinand et al. ............... 83/574 X |
| 4,335,512 | 6/1982 | Sheps et al. . |
| 4,350,193 | 9/1982 | McCambridge et al. ........ 83/574 X |

*Primary Examiner*—Frank T. Yost
*Attorney, Agent, or Firm*—Bogucki, Scherlacher, Mok & Roth

[57] ABSTRACT

A saw highly accurate, light weight guide assembly releasably attached to a portable power saw to provide the accuracy of a table saw while retaining the convenience of a portable saw. The saw includes a bidirectionally telescoping slide assembly having an outer track which attaches on one side to saw receiving base plate and an inner track which attaches on the other side to a guide arm and compass assembly. For ease of carrying the guide arm may be retracted while retaining a predetermined compass angle setting and the tracks may be secured together by a quick release latch. A set of ball bearings engages planar surfaces on the tracks to form a point contact which minimizes clogging while affording a smooth and easy yet stable sliding action for the two tracks.

27 Claims, 8 Drawing Sheets

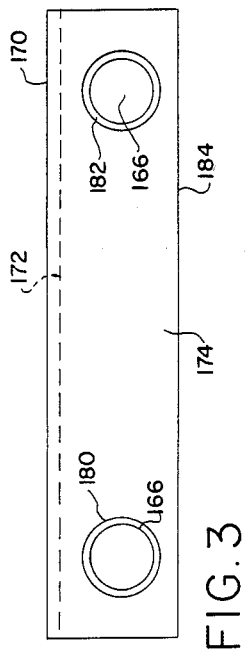
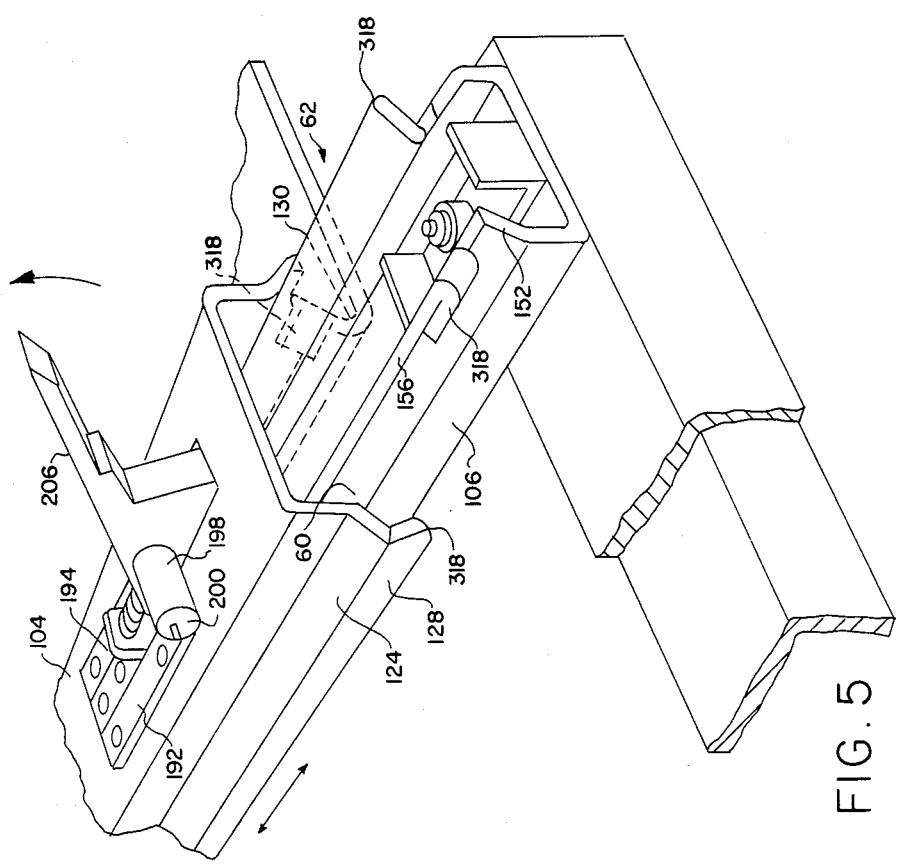
FIG. 3
FIG. 5

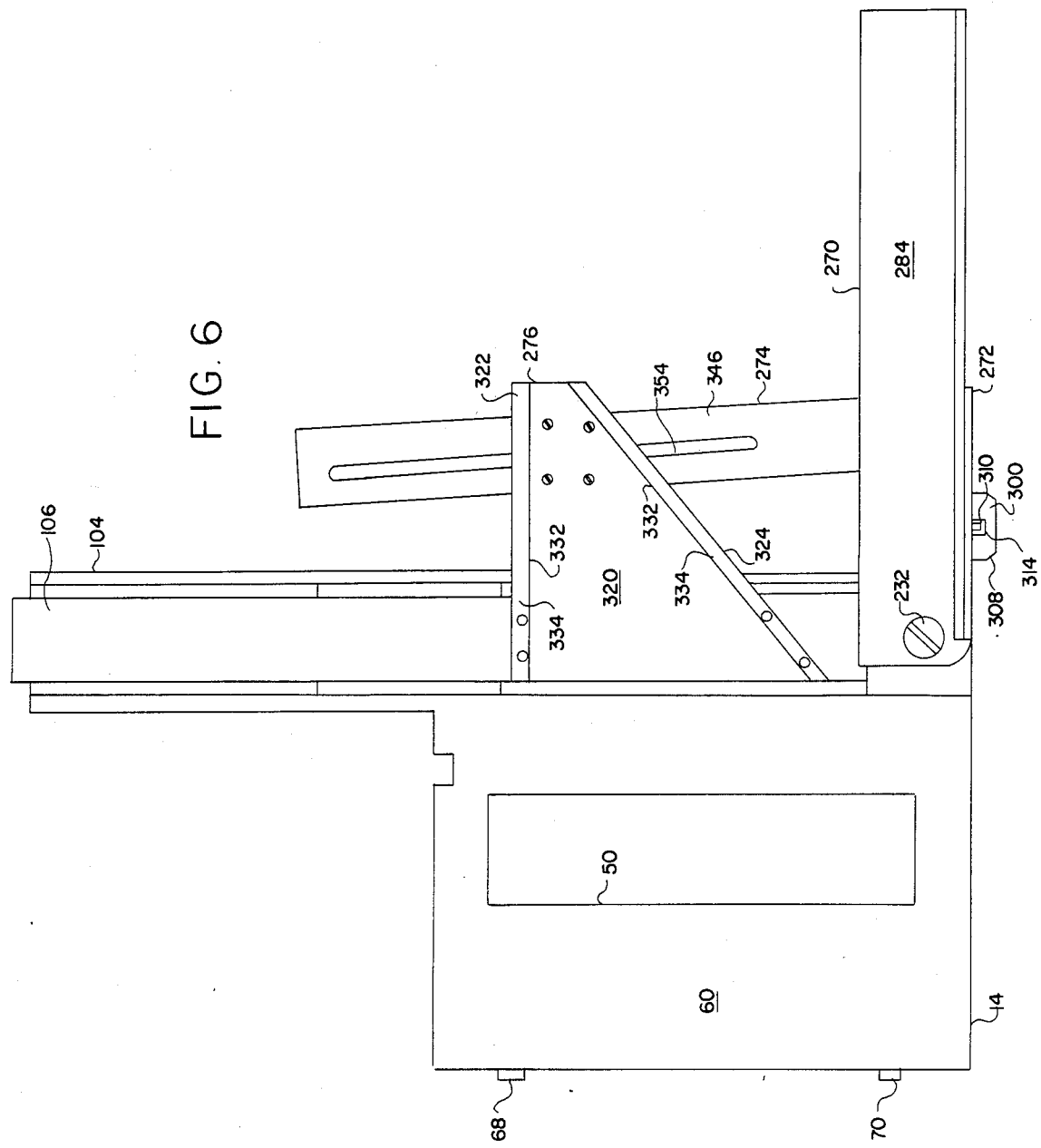

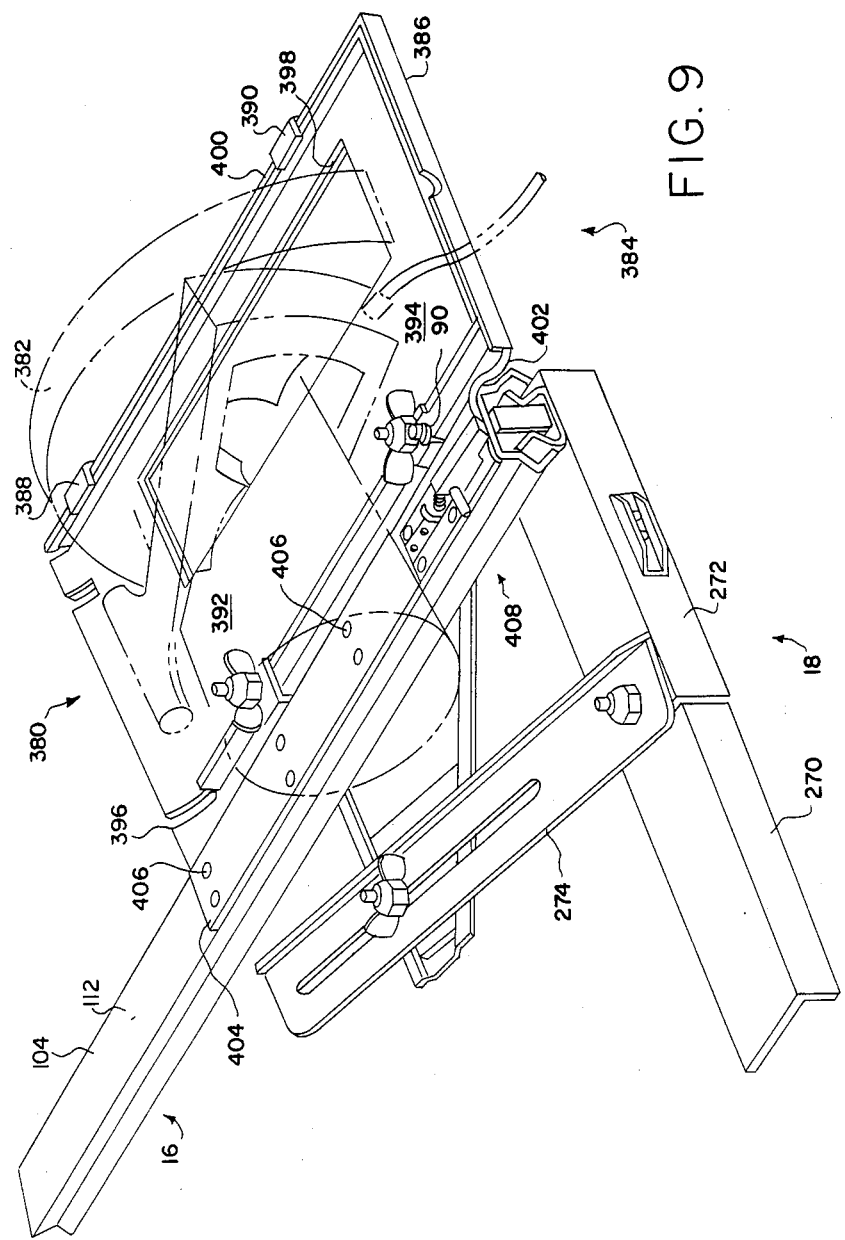

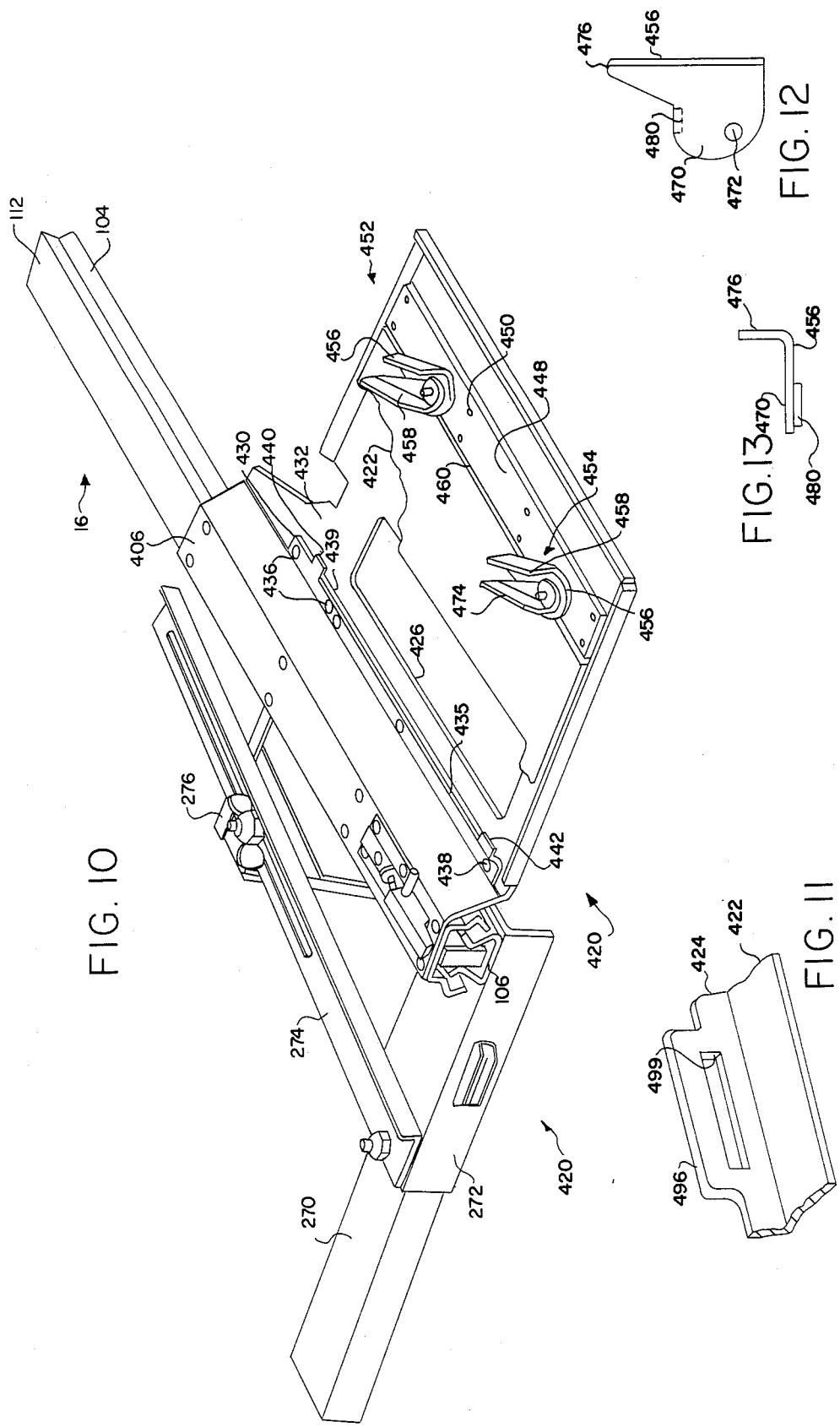

SELF GUIDING PORTABLE SAW WITH SAW GUIDE ASSEMBLY

BACKGROUND OF THE INVENTION

A saw has come to be one of the most commonly used tools for construction and structural fabrication. Because of their ease of use and versatility, power driven circular saws have gained widespread acceptance for wood framing and similar applications. Power driven circular saws are available in many sizes ranging from heavy, fixed installations such as radial arm saws or table saws to relatively light weight hand held portable saws.

While portable saws are convenient because of their light weight, they are also difficult to use. Their very portability makes it difficult to obtain an accurately positioned, precision straight line cut. Often times years of experience are required before a worker can made fast, accurate cuts on a rotatable basis using a portable saw. However, hiring highly experienced workers to operate a power saw adds substantially to construction costs. Frequently less experienced workers are used and the result is often lower quality workmanship which may produce a finished product that is either esthetically or structurally flawed. Portable saws are also prone to experience a kickback or violent jerking motion if a saw cut is not maintained prefectly straight. This particularly becomes a problem when the wood being cut is not completely dry.

For these reasons it is common for a construction contractor to establish a fixed sawing center for use at a construction project. This facilitates good quality cuts with less experienced labor but increases material handling costs. When delivered, the wood must be unloaded and stacked near the sawing center. It must then be moved to a position next to a saw, sawed and stacked. It must then be moved again to a location at which it is to be finally used. Invariably some of the wood is sawed to an incorrect length or routed to a wrong final assembly location. This not only necessitates additional handling but may idle skilled workers and slow construction while correct replacement materials are obtained.

A pressing need thus exists for an accurate, light weight, self guiding portable saw that would enable an inexperienced user to make fast but accurate cuts. Such a saw could be advantageously used as either a primary sawing tool or as a custom fitting supplement to a fixed position sawing center.

Many attempts have been made to produce a self guiding portable saw. However, because of high manufacturing costs, difficulty of use, excessive weight or other reasons, these self guiding saws have not achieved widespread popularity.

U.S. Pat. No. 4,335,512 to Sheps et al discloses a dual slide arrangement having two telescoping ball bearing connected slides. The slides have rounded bearing engaging surfaces which produce an arc of engagement and hence entrapment of sawdust with a consequent tendency to clog the track. Stops are located centrally of the inner slide relative to the outer slide. The alignment mechanism or fence 63 hasa not horizontal member extending over the workpiece. It thus cannot be accurately and securely clamped to the workpiece by hand, making it difficult to use the saw guide with a relatively narrow workpiece such as a 2×4. Furthermore, when retracted, the saw travels back over the guide member, further interfering with manual securing of the guide mechanism to the workpiece.

U.S. Pat. No. 3,991,643 to Girardin shows a guide arrangement with a slide which is extendable over a substantial distance in each direction. However, the slide is not bearing mounted to the track and the cut is made with the saw being drawn toward rather than away from the user. Furthermore, the guide is not portable but must be fastened to the table while a workpiece must have a predetermined thickness matching a mounting spacer. There is no self contained guide for aligning the workpiece with the saw blade.

Several references teach a single track and follower arrangement in which a relatively long track engages a relatively short follower that must remain within the longitudinal boundaries of the track. Such arrangements have a limited range of motion compared to a bidirectional dual track arrangement.

One single track arrangement is disclosed in U.S. Pat. No. 3,454,056 to Pahlck. In this arrangement the guide pivots out of the way at the end of the limited travel distance to permit additional cutting motion. However, the additional cutting motion is necessarily unguided. In addition, the guide is secured to the relatively short slide bar or track by four wheels which engage close fitting, mating side grooves on either side of the slide bar. This close fitting relationship over a considerable area increases the danger of clogging from sawdust after extended use.

U.S. Pat. No. 3,045,724 to Mitchel discloses another single track and follower arrangement. In this instance the track is secured to a workpiece guide member and the follower is secured to a saw. Two spaced apart sets of 3 ball bearings each are secured by a race and mount the follower to the track. While the ball bearings make a dual line contact with the track, they make an accurate contact with the follower which invites clogging from accumulations of sawdust.

U.S. Pat. No. 2,735,455 to Forsberg discloses another single track and follower arrangement. In this arrangement the track comprises a longitudinally extending vertical wall and the saw is fitted on the side thereof with an inverted U-shaped follower which slidingly engages the vertical track wall. An intended C-clamp mounting to a workpiece securely limits the convenience of using the guide.

Another single track and follower arrangement is taught by U.S. Pat. No. 4,023,273 to Treleaven. In this arrangement the saw travels longitudinally between two laterally spaced track defining side members. The follower is secured to the two side tracks by relatively wide rollers which matingly engage close fitting, U-shaped tracks. The arrangement is thus susceptible to clogging from accumulations of sawdust.

U.S. Pat. No. 3,903,774 to Stinson teaches an arrangement in which the follower is secured to a fairly short track by a sliding tongue and groove arrangement. The guide member engages only the back edge of the workpiece.

Still another track and follower arrangement is taught by U.S. Pat. No. 2,942,633 to King. This arrangement uses a slide bar track which is inconveniently clamped to the workpiece and an invert U-shaped follower which fits over the track and fastens to the saw. The follower slideably engages the track and is readily lifted off the track. The saw is raised a considerable distance above the workpiece.

U.S. Pat. No. 3,869,951 to Litwin teaches still another track and follower arrangement in which the follower slidingly engages the track. The unadjustable guide engages both back and top surfaces of the workpiece but the saw is positioned above the track and follower and hence in vertically spaced relationship to the workpiece.

Miter box arrangements such as those taught by U.S. Pat. No. 335,738 to Booyer or U.S. Pat. No. 4,315,494 to DePlacido offer the advantage of precision cutting but not the convenience of a truly portable saw guide.

SUMMARY OF THE INVENTION

A rugged, light weight portable saw guide assembly for a self guiding portable power saw in accordance with the invention includes a base plate having a flat, horizontally extending bottom surface for engagement with a workpiece on a bottom side and supporting a power saw on the top side, a bidirectionally telescoping slide mechanism, and a pivotable angle guide mechanism that is deployable and retractable to provide a smaller form profile for convenience in carrying and handling. The slide mechanism includes an inverted U-shaped outer track which is fixedly secured adjacent a rearward end thereof to the base plate with the base plate being disposed on one side of the outer track and a mating U-shaped, latchable inner track that is slidably disposed within the outer track and is fastened at a rearward end thereof to the angle guide mechanism.

On each side of the slide mechanism a mating pair of outer and inner track side members defines four planar load bearing surfaces that are disposed in spaced apart opposed pairs to form a race that receives and retains a set of at least two ball bearings from a ball bearing assembly. The four planar surfaces provide a point contact between each surface and a ball bearing which discourages clogging and encourages clearance of any saw dust from the race. The bearing assembly further includes a bearing guide which maintains the ball bearings in properly spaced relationship. A quick release latching mechanism latches the outer and inner tracks together in a coextensive relationship for ease of carrying and handling.

The retractable angle guide mechanism facilitates a saw cut angle between 45° and 135° and includes an angle shaped guide support member, a retractable angle shaped guide member nested within the guide support member, a generally planar, triangle shaped compass support and a compass arm having a slide end slidably secured to the compass support and an opposite pivot end pivotally secured to the guide support member. The angle guide assembly enables the saw guide to be manually secured to a workpiece to prevent binding and jumping of the saw during operation.

The power saw may be either permanently secured to the base plate or may have its own conventional sole plate or other mounting arrangement which is releasably secured to the base plate as by a pair of quick release hold downs. A preferred mounting arrangement provides positive, edge blocking containment that does not rely upon frictional engagement to prevent relative slippage in any plane of potential motion between the saw sole plate and the base plate. The saw guide assembly is advantageously manufactured from alloy aluminum roll stock which may be readily formed in high speed presses while providing high strength and long, corrosion resistant life.

BRIEF DESCRIPTION OF THE DRAWINGS

A better understanding of the invention may be held from a consideration of the following Detail Description, taken in conjunction with the accompanying drawings in which:

FIG. 3 is a side view of a bearing guide assembly used in the self guiding portable power saw shown in FIG. 1;

FIG. 5 is an enlarged fragmentary perspective view of the rearward end of the saw guide assembly portion of the self guiding portable power saw shown in FIG. 1;

FIG. 6 is a bottom view of a saw guide assemlby for the self guiding portable power saw shown in FIG. 1;

FIG. 9 is a partially phantom perspective view of an alternative embodiment of a self guiding power saw in accordance with the invention having an axially aligned motor and a saw blade on a side of the saw opposite a slide assembly;

FIG. 10 is a perspective view of a saw guide assembly for another alternative embodiment of a self guiding portable power saw having the saw blade on a side of the saw adjacent a slide assembly and illustrating an alternative positive locking quick release mechanism;

FIG. 11 is a fragmentary perspective view of a lock engaging aperture in a saw adapted to be mounted on the saw guide assembly shown in FIG. 10;

FIG. 12 is a top plan view of a preferred arrangement of a hold down for the saw guide assembly shown in FIG. 10; and FIG. 13 is a front view of the hold down shown in FIG. 12.

DETAILED DESCRIPTION

Figure 1:
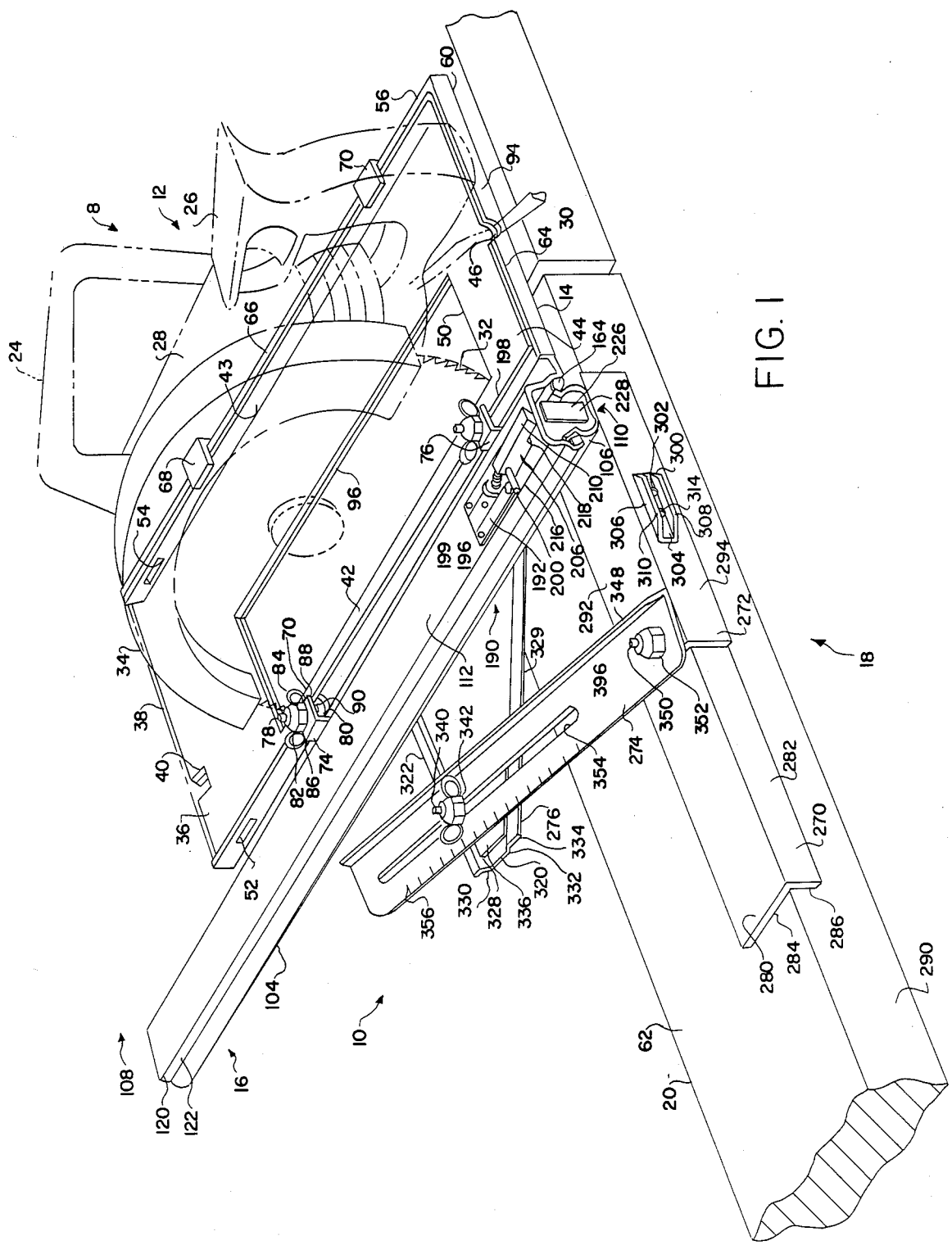
FIG. 1 is a partly phantom perspective view of a self guiding portable power saw in accordance with the invention.

Referring to FIG. 1, a self guiding portable power saw 8 in accordance with the invention includes a saw guide assembly 10 and an electrically powered circular saw 12. The saw guide assembly 10 includes a base plate assembly 14, a bidirectionally telescoping dual track slide assembly 16, and a guide assembly 18 which is angularly pivotable to control an angle of cut through a workpiece 20.

The saw 12 is generally conventional in nature and therefore shown only in phantom representation in FIG. 1. The saw 12 includes a pair of handles 24, 26, and electrical motor 28, and electrical cord 30 connecting the motor 28 to a utility power supply, a circular saw blade 32, a guard assembly 34, and a sole plate 36. The saw 12 is connected to the saw guide assembly 10 only by the sole plate 36 and therefore the other components of the conventional saw 12 are shown only in general outline. In the present instance the saw 12 is an in-line saw in which the shaft of the motor 28 extends in a longitudinal direction and is coupled to the saw blade 32 through a gear box which is not shown in FIG. 1.

The sole plate 36 is a generally planar flat plate having a forward end 38 which is ramped or tapered upwardly to prevent gouging of a workpiece and a saw cut alignment notch 40 which facilitates alignment of the saw and blade 32 with the intended cutting path through the workpiece 20. The sheet metal sole plate 36 is strengthened on the left, right, and rear sides by upwardly extending peripheral flanges 42, 43, and 44 respectively. In the particular model of saw 12 shown in FIG. 1, the electrical cord 30 is disposed relatively close to the sole plate 36 and hence a semicircular notch 46 is formed in rear flange 44 to accommodate passage of the cord 30 therethrough. Depending upon the location of the cord 30, the notch 46 may or may not be required.

A rectangular blade aperture 50 is formed in the sole plate 36 toward the left side thereof but in parallel spaced relationship to the left side flange 44. The blade aperture 50 facilitates passage of the circular saw blade 32 through the base sole 36 and into engagement with the workpiece 20. The blade aperture 50 is positioned to receive the blade 32 and is typically positioned toward either the left side of the sole plate 36 or the right side, depending upon the particular model of saw 12 which is being used. The reinforcement flanges 42, 43 each have a rectangular aperture or slot 52, 54 respectively for receiving a conventional rip guide which enables the saw to maintain a fixed distance from a board edge while making an extended saw cut.

The base plate assembly 14 includes a base plate 56 which is a generally flat planar element having substantially the same length and being somewhat wider than the sole plate 36. The base plate 56 has a generally flat horizontally extending bottom surface 60 which engages and slides against a top surface 62 of workpiece 20. Base plate 56 has an upwardly extending rear flange 64 which is abuttingly engaged by the rear flange 44 of sole plate 36 and a right hand flange 66 which is abuttingly engaged by the right hand flange 43 of sole plate 36. Two locking vertical L-shaped locking ears 68, 70 are affixed to the right hand flange 66 adjacent the forward and rearward ends thereof respectively. the locking ears 68, 70 have a vertical leg affixed to the flange 43 by rivotting, welding or other suitable means and a horizontally extending upward leg which extends inwardly over the top of flange 43 of sole plate 36 to confine the right hand side of sole plate 36 between the locking ears 68, 70 and the top surface of the flat portion of base plate 56.

The left hand flange 42 of sole plate 36 is secured to the base plate 14 by a pair of hold down locking assemblies 74, 76 disposed to engage the flange 42 adjacent respectively the forward and rearward ends thereof. Each locking assembly 74, 76 includes a vertically extending threaded bolt 78 having one end affixed to the base plate 14 at a position to the left of the sole plate 36 and with a threaded end extending vertically upward.

An inverted L-shaped locking element 80 has a vertically extending leg in contact with the top surface of base plate 56 and at the upper edge thereof a horizontally extending element which extends over the top of and into engagement with the top surface of left hand flange 42 and sole plate 36. The horizontally extending leg of locking element 80 has an aperture therethrough which receives the threaded end of bolt 78. A wing nut 82 is threaded onto the threaded end of bolt 78 and screwed down until it engages the horizontal leg of locking element 80 to force locking element 80 into a tight, frictional engagement with the top surface of flange 42.

The distance from the bolt 78 to a free end 84 of locking element 80 is somewhat greater than the distance from bolt 78 to either the left side 86 or the right side 88 so that rotating the locking element 80 90° enables the locking element to clear the flange 42 and enable the saw 12 including the flange 42 to be readily lifted past the locking element 80 and out of engagement with the base plate 14. In addition, a coil spring 90 may be advantageously placed concentrically about the bolt 78 between the horizontally extending leg of locking element 80 and the surface of base plate 14. The coil spring 90 or a similar resilient element maintains the locking element 80 vertically upward against the wing nut 82 to help maintain the locking element 80 in a rotational position to which it is moved and also to enable it to readily clear the top of flange 42 when locking element 80 is rotated into the locking position prior to tightening of the wing nut 82.

It will be appreciated that with the locking assemblies 74, 76 in a secured and tightened condition, the sole plate 36 is firmly secured to the baase plate 56. The rear flange 64 provides nonfrictional, abuttng engagement with rear flange 44 to prevent rearward motion of the sole plate 36 while right hand flange 66 provides nonfrictional abutting engagement with right hand flange 43 to prevent rightward lateral motion of the sole plate 36 relative to base plate 56. Similarly, the locking ears 68 and 70 prevent vertical motion of the right hand portion of sole plate 36 with respect to base plate 56. On the left hand side, the locking elements of hold down locking assembly 74, 76 provide positive abutting engagement with the top of flange 43 to prevent vertical motion of the left and edge of sole plate 36 relative to the base plate 56. Tight frictional engagement between the hold down locking assemblies 74, 76 and the top of flange 42 as well as the mating surfaces at the bottom of sole plate 36 and top of base plate 56 prevent forward and left hand lateral motion between the sole plate 36 and base plate 56.

In addition, the forward edge of base plate 56 is advantageously ramped or tapered upward into a shape conforming to the tapered shape of the forward edge of sole plate 36. The mating relationship between the forward edge of sole plate 36 and the forward edge of base plate 56 further assists in preventing the base plate 36 from moving forward relative to base plate 56 when in the locked condition.

Notwithstanding the security of the saw 12 within the base plate 56 when in a locked condition, it is readily removed and reinserted. The saw is readily removed by loosening the wing nuts 80 of hold down locking assemblies 74, 76, and rotating the locking elements 80 thereof by 90 degrees. The saw 12 and sole plate 36 can then be readily lifted out of the base plate 56. Similarly, upon reinserting the saw, the flange 43 is slipped under the locking ears 68, 70 and the left hand side o the saw is then lowered into position. Next, the locking elements 80 of the hold down locking assemblies 74, 76 are rotated 90 degrees to the hold down position and the wing nuts 82 are thentightened to secure the saw 12 in place. It will be noted that the rear flange 64 of base plate 56 has a semicircular notch 94 which generally conforms in shape to the semicircular notch 46 in the rear flange 44 of sole plate 36. Similarly, a rectangular leg receiving aperture 96 is disposed in the flat portion of base plate 56 approximately coextensively with the leg receiving aperture 50 of sole plate 36. This arrangement advantageously separates the sole plate 36 of saw 12 from the top surface 62 of workpiece 20 by only the relatively small thickness of the base plate 56. The base plate 56 as well as other sheet metal portions of saw guide assembly 10 may advantageously be made of a relatively thin sheet metal material such asa 12 gauge 5086 Megalloy alloy aluminum. In alternative arrangements the saw 12 could be eight permanently or removably fastened directly to the base plate 56 without use of a separate sole plate 36.

The slide assembly 16 includes outer and inner tracks 104, 106 of substantially equal length and extends between a forward end 108 and a rearward end 110. The length of the slides 104, 106 is preferably in the range of 16 to 24 inches for construction applications. It is preferred that the slide be sufficiently long to enable the saw 12 to be guided through a two by twelve while cutting at any angle between 45 and 135 degrees relative to the longitudinal direction of the workpiece 20. The exact length of the slide which is required to accomplish this will depend upon the particular configuration of the saw 12 and whether the saw blade 32 is mounted on the side of the saw 12 adjacent slide 16 or opposite slide 16. It will be readily appaarent that the slide must be somewhat longer if the saw blade is mounted on the side of the saw opposite slide 16.

Figure 2:
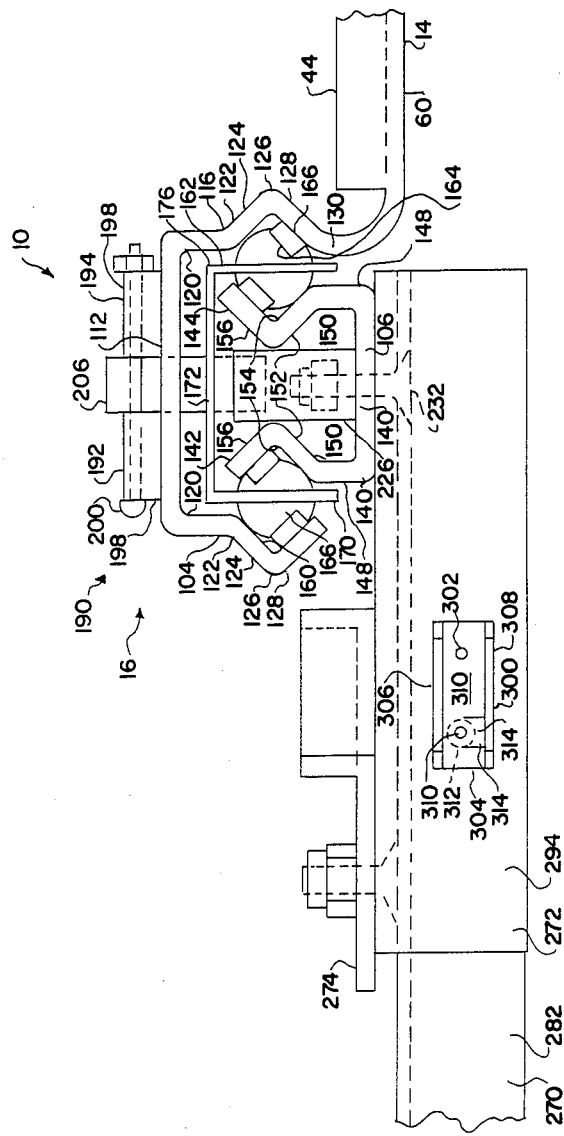
FIG. 2 is a fragmentary rear view of the self guiding portable power saw shown in FIG. 1.

Referring now to the rear view of saw guide assembly 10 shown in FIG. 2 as well as FIG. 1, it will be seen that the outer and inner tracks 104, 106 are of substantially equal length. The outer track 104 has a generally flat, horizontally extending web portion 112 which is approximately 2 inches wide and extends between left and right downwardly depending side members 114, 116. The side members 114, 116 have a vertically extending portion 120 adjacent to the web portion 112, which is connected at the downward edge by a 45° outward bend 122 to an upper planar section 124 which extends at approximately 45° to the vertical. The upper planar section 124 terminates at its lower edge in a 90° bend 126 which connects the lower edge of the upper planar section 124 to an upper edge of an inwardly extending lower planar section 128 which also extends at approximately 45° to the vertical. The left side member 114 terminates at the lower planar section 128. However, the right side member 116 has a connection bend 130 which is integral with both the lower edge of the right side member 116 and the left hand edge of the base plate 56 to provide a continuous, integral connection between the upper track 104 and the base plate 56.

The lower track 106 has a generally mirror imaged mating relationship to the upper track 104 and includes a generally flat web portion 140 which is approximately 1 ⅜″ wide and extends between left and right side members 142, 144 respectively. Each of the side members 142, 144 extends generally vertically upward from the lateral extremities of the web portion 140 and includes a vertically extending portion 148 immediately adjacent to the web portion 140. An upper edge of vertically extending portion 148 terminates in an inwardly extending 45° bend 150 which connects the vertical portion 148 to a lower planar section 152 which extends inwardly of lower track 106 at an angle of approximately 45 degrees to the vertical. The upper edge of planar section 152 terminates in an outwardly extending 90° bend 154 which connects the upper edge of lower planar section of 152 to a lower edge of an upper planar section 156. Upper planar section 156 extends at 45° to the vertical and perpendicular to lower planar section 152. The upwardly extending side members 142, 144 of lower track 106 terminate at upper edges of the upper planar sections 156. The planar sections 124, 128, 152, 156 each have a length of approximately ⅞″ at the interior surfaces thereof.

Opposing pairs of the planar sections of the side members 114, 142 and 116, 144 are spaced ½ inch apart and define longitudinally extending races 160, 162 having a square cross section. Each race 160, 162 receives a set of at least two, ½ inch steel ball bearings 166 which are retained within the races 160, 162 by the planar surfaces 124, 128, 152, and 156.

Stops 164 are placed at each end of the races 160, 162 in relation to both the outer track 104 and inner track 106 to prevent the ball bearings 166 from escaping past the ends of the races 160, 162. The steps 164 may be small tabs of metal or plastic secured by screws or other means to the rearward and forward ends 110, 108 of tracks 104, 106. Alternatively, the lower planar section 128 of outer track 104 and upper planar section 156 of inner track 106 may have their extremities bent inward toward the race 160 or 162 at each end. Other arrangements of stops may also be employed.

It will be observed that the spherical ball bearings 166 make a point contact with the interior race surfaces of each of the planar sections 124, 128, 152 and 156. When the ball bearings 166 move through the races 160, 162 in a longitudinal direction as the outer and inner tracks 104, 106 are telescoped or slid relative to each other, the ball bearings 166 trace a line contact with each of planar sectios 124, 128, 152, and 156. As a result of this instantaneous point contact or slide path defined line contact, the ball bearings 166 are able to push out of the way any small particles of saw dust or other debris which may collect within the races 160, 162.

At the same time, the shape of the slide assembly helps to protect and shield the slide assembly 16 from accumulations of debris. The inverted U-shape of the outer track 104 serves as an umbrella or shield for dust accumulations and tends to keep the dust and other particles out of inner track 106 while the inner track 106 is telescoped within the outer track 104. Even as the inner track 106 telescopes beyond either the rearward end 110 or the forward end 108 of the outer track 104, the shape of the upper planar sections 156 tends to shield the lines of bearing engaging contact from accumulations of sawdust. The generally vertically extending orientations of the bearing engaging surfaces of the planar sections further tends to inhibit the accumulation of sawdust or other debris therein. The quadruple single point contact between the bearings 166 and the boundaries surfaces of the race ways 160, 162 thus provides a smooth extremely stable relative motion as the outer track 104 and inner track 106 are longitudinally telescoped relative to one another with the inner track 106 extending beyond either the rearward end 110 or the forward end 108 of the outer track 104.

An inverted U-shaped bearing guide 170 has a planar web member 172 extending horizontally between two planar, downwardly projecting side members 174, 176. A side view of bearing guide 170 is shown in FIG. 3 to which additional reference is now made. The bearing guide 170 has an overall length of 4 inches, an outside height of ⅞″ and includes bores 180, 182 of 0.502″ diameter at the forward and rearward end thereof respectively for receiving ½ inch diameter ball bearings 166.

The apertures 180, 182 have a center to center longitudinal spacing of 3 inches and their centers are vertically located ⅜" above a bottom edge 184 of the left end right side members 174, 176. The bearing guide 170 may be advantagesouly formed from 18 gauge corrosion resistance steel. Additional bores may be provided for receiving additional ball bearings 166 but two have been found to be optimum. Additional ball bearings 166 tend to increase friction and reduce the ease of sliding without significantly increasing strength or stability.

A latch assembly 190 secures the outer track 104, and inner track 106 ina retracted, longitudinally coextensive position for ease of carrying or otherwise handling the saw guide assembly 10.

Figure 4:
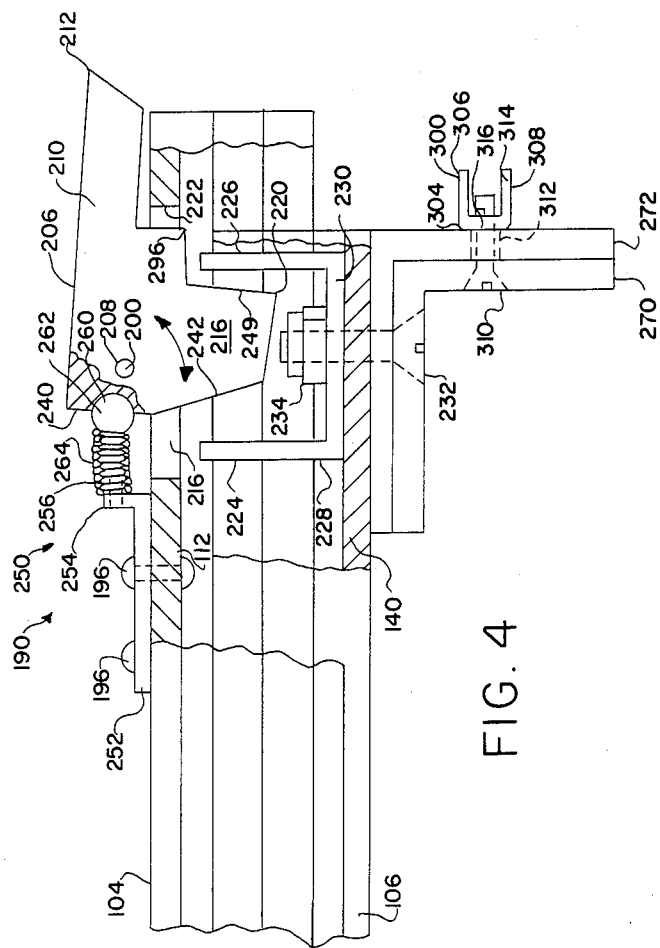
FIG. 4 is a side view, partly broken away and taken from the left hand side of the self guiding portable power saw shown in FIG. 1.

Making further reference now to FIGS. 4 and 5, the latch assembly 190 includes a pair of laterally spaced hinge brackets 192, 194 secured to the web portion 112 by rivets 196 or other suitable means. Each of the hinge brackets 192, 194 is looped at its rearward end to form a pin guide 198 having a laterally extending bore there through for receiving and supporting a hinge pin 200. In the present example the hinge pin 200 is conveniently implemented as a threaded bolt and a nut threadedly engaging the bolt to maintain the bolt in place. Other arrangements such as a nonthreaded pin with two enlarged ends to maintain the pin within the pin guide would of course be suitable. A latching member 206 has a laterally extending bore 208 for receiving hinge pin 200 to pivotally mount the latch pin 206 about the hinge pin 200. In the latched position shown in FIGS. 1, 2 and 4, the latch member 206 has a generally L-shape with a longtudinally extending leg 210 that extends rearwardly from hinge pin 200 and pivots downward into engagement with the top surface web member 112 of outer track 104. In the present example thelongitudinally extending leg 210 has a rearward tip 212 which extends slightly beyond the rearward end of outer track 104 to enable an operator to easily engage the tip 212 with a thumb and flip the latch member 206 upward or in a counterclockwise direction when viewed from the left side (see FIG. 5). The latch member 206 also has a downwardly depending leg 216 which depends downwardly through a latch receiving aperture 218 in the web portion 112 of outer track 104. When the latch member 206 is rotated upward or counterclockwise to an unlatched position, a rearward and downward most tip 220 engages a rearward end 222 of aperture 218 to form a stop. Although not specifically shown, it will be appreciated that when latch 206 is rotated to the unlatched position, the downward depending leg 216 is able to clear the longitudinally spaced, vertically extending tabs 224, 226 which form part of a latch stop 228.

The latch stop 228 further includes a central, longitudinally extending web portion 230 which is secured to the web portion 140 of inner track 106 by a flat head screw 232 and self-locking nut 234.

The forward edge of downward depending leg 216 has a generally vertically extending flat surface 240 which at approximately the plane of web portion 112 of outer track 104 engages a rearwardly angles flat surface 242 which is designed for engagement with vertically extending tab 224. The rearward edge of downward depending leg 216 is defined by a generally vertically extending flat surface 244 and a notch 246 which enables latch member 206 to clear the rearward edge 222 of aperture 218 while still maintaining substantial physical strength and integrity.

Disposed between the two hinge brackets 192, 194 is a snap action assembly 250 which resiliently biases latch member 206 so that it forms a snap through center action which tends to maintain it in either a latched or an unlatched position. Snap action assembly 250 includes a forward plate 252 which is secured to the top side of central web member 112 of outer track 104 by suitable rivtes 196 or other fastneing means. The rearward end of forward plate 252 terminates in a vertically extending flange 254 which receives and supports a longitudinally extending holding pin 256 approximately centrally across the lateral width of the outer track 104 and slightly above the top surface of the web portion 112 of outer track 104. The vertically extending flat surface 240 of latch 206 includes a hemispherical aperture 260 which receives and supports a ¼ inch ball bearing 262. A generally longitudinally extending coil spring 264 extends between the flange 254 and the ball bearing 262 with a forward end disposed concentrically about the holding pin 256 and a rearward end disposed concentrically about ball bearing 262. The coil spring 264 is securely but resiliently compressed between the flange 254 and ball bearing 262 so as to maintain a lateral and rearwardly extending force against the latch member 206 adjacent the vertically extending surface 240. The hemispherical aperture 260 is positioned with a center point slightly above a center point of hinge pin 200 and bore 208 so that when the latch member 206 is rotated downward or clockwise to the latched position as shown in FIG. 4, the snap over center action of the snap action assembly 250 tends to maintain the latch member 206 in the latched position. Similarly, when the latch member 206 is rotated counterclockwise about hinge pin 200, the ball bearing 262 and hemispherical aperture 260 are rotated below the center of rotation of latch member 206 so as to tend to maintain the latch member 206 in an unlatched position.

It will be further noted that in the latched position as shown in FIG. 1, 2 and 4, the lower track 106 is securely latched against forward traavel relative to outer track 104. In the event that the inner track 106 attempts to move forward relative to outer track 104, the vertical tab 226 will quickly engage the rearward surface 244 of latch member 206 and further forward relative motion is prevented. Since latch member 2060 is in a secure stop position, the inner track 106 is securely locked against forward motion relative to outer track 104. In contrast, should the inner track 106 move rearwardly relative to outer track 104, the vertically extending tab 224 will engage rearwardly angled flat surface 242. Any engagement force will tend torotate teh latch member 206 counterclockwise toward and unlatched position. This rotation is opposed by the latching force of the snap action assembly 250 which tends to maintain the latch member 206 in the latched position. However, if the vertical tab 224 bears against the surface 242 with sufficient force it will overcome the maintaining force of snap action assembly 250 and cause latch member 206 to rotate counterclockwise upward toward its unlatched position. In this position the flat surface 242 vertically clears the tab 224 so that the inner slide 106 is free to slide longitudinally relative to the outer slide 104. Furthermore, the snap over center action of the snap action assembly 250 tends to maintain the latch member 206 in its unlatched position.

It will thus be seen that the latch mechanism is easily engaged by positioning the latch stop 228 beneath the latch member 206 and manually rotating the latch member 206 to its latched position as shown in FIGS. 1, 2 and 4. In this configuration, the inner track 1060 is securely latched against forward travel 104 to enable an operator to easily carry the saw guide assembly 10 while holding it in a rearward position with the forward end of the saw guide assembly pointed downward. This is the natural carrying position and the tracks 104, 106 are locked relative to one another while the saw guide assembly 10 is maintained in this position.

Once it is desired to unlatch the latch assembly 190, the operator can readily place his thumb against the rearward tip 212 and unlatch the latch member 206 or alternatively by exerting a modest rearward force on the lower or inner track 106 relative to the upper or outer track 104, the vertically extending tab 224 engages the surface 242 and rotates the latch assembly 190 without having to use a free hand to rotate the latch member 206.

The guide assembly is best shown in FIGS. 1, 2, 4 and 5 and includes an L-shaped guide arm 270 nested within an L-shaped guide support arm 272, a compass slide bar 274 and a generally triangular shaped compass support arm 276. The guide arm 270 and guide support arm 272 are pivotally secured to the bottom side of web portion 140 of inner track 106 near the rearward end thereof by the flat head screw 232 and self-locking nut 234.

The guide member 270 is an angle shaped member having a horizontally extending leg 280 and a vertically extending leg 282 which exetnds vertically downward from the rearward edge of the horizontally extending leg 280. A bottom surface 284 of horizontally extending leg 280 lies in the workpiece defining plane and is secured against the top surface 62 of workpiece 20 by a left hand of an operator. The free end of guide member 270 extends approximately 3-6 inches beyond the free end of guide support member 272 to provide a hand holding region to facilitate this manually clamping of the guide member 270 to the workpiece 20. As guide member 270 is clamped to workpiece 20, a forward surface 286 of downwardly depending leg 282 engages a rearward edge 290 of workpiece 20. The guide member 270 is thus firmly secured to workpiece 20 during saw cutting operations.

The guide support member 272 has a cross-sectional shape similar to the guide member 270 and includes a horizonally extending leg 292 and a leg 294 which extends vertically downward from the rearward edge of horizontally leg 292. A keeper 300 is pivotally secured to the vertical leg 294 of guide support arm 272 by a suitable fastener 302 which might for example be either a bolt and self-locking nut or a rivet. Keeper 300 is a generally U-shaped laterally extending member having a vertically extending central web portion 304 and upper and lower flanged 306, 308 depending rearwardly therefrom on either side of the web portion 304.

A locking pin in the form of a flat head screw 310 has its head end secured to the guide arm 270 on a side of the fastener 302 opposite the pivot mounting at screw 232 and extends through an aperture 312 in guide support arm 272 as well as an aperture 314 in keeper 300. The locking pin 310 has a notch 316 (best seen in FIG. 4) formed in the top side thereof adjacent its rearward end which lockingly receives and engages an edge of aperture 314 in keeper 300.

When keeper 300 is rotated upwards or clockwise about fastener 302 the engagement between notch 316 and aperture 314 of keeper 300 is released and the guide arm 270 is free to rotate clockwise about screw 232 toward compass support arm 276 and generally toward parallel alignment with the inner and outer tracks 106, 104. Because compass support arm 276 has a generally planar bottom surface 320 which lies in the top surface 62 of workpiece 20 and is coplanar with bottom surface 284 of guide member 270, guide member 270 rotates into a butting interference with compaass support arm 276. However, by maintaining a slight amount of looseness between the pivot screw 232 and its associates self-locking nut 234 and because of the substantial length of guide arm 270 and the relative thinness of the horizontally extending leg 280, guide support arm 270 is readily deflected downward so that it may rotate beneath the bottom surface 320 of compass support arm 276. This enables the guide arm 270 to be rotated to a retracted position nearly parallel with the outer and inner tracks 104, 106 in which the lateral extend or dimension of the saw guide assembly 10 is substantially reduced to render a relatively compact configuration that is convenient for carrying or shipping. It will be appreciated that in this retracted position only the compass support arm 276 and guide support arm 272 extends laterally to the left side of the tracks 104, 106 and that the lateral extent of these members is considerably less than that of the guide arm 270.

The lateral extend of the guide support arm 272 can be further reduced by rotating it clockwise into engagement with the compass support arm 276. Alternatively, the compass support arm 272 may be maintained in a predetermined locked position during retraction of the guide arm 270 to enable the guide arm 270 to be subsequently quickly deployed to engagement with the guide support arm 272 to provide a predetermined, carefully aligned cutting angle.

In the arrangement shown in FIG. 5 the races 60, 62 are shown as being closed at the rearward end of each outer and inner track 104, 106 by a bend ⅜ whereat an extremity of a track side is bent 180° back onto itself and into the path of the race 60 or 62. The track material is sufficiently thick that the race is partially closed at the line of contact between the bearings and the planar surface sections 124, 128, 152 and 156. The track material is sufficiently thick to partially block the races 60, 62 and prevent the bearings 166 from escaping therefrom.

Making further reference to the bottom view shown in FIG. 6, the compass support arm 276 is secured by rivets, screws, or other suitable fastening means to the bottom surface of inner track 106 at a longitudinal position therealong which is spaced somewhat forward of the pivot screw 232. Compass support member 276 is formed from sheet metal and preferably 12 gauge aluminum alloy and has a forward edge 322 which extends laterally from the inner track 106 approximately perpendicular thereto and a rearward edge 324 which extends laterally from the inner track 106 at an angle of approximately 45 degrees to provide a triangular configuration to the compass support member 276. The forward edge 322 and rearward edge 324 are strengthened by providing an L-shaped member having at the forward edge a vertically extending leg 328 and a horizontally extending leg 330. Similarly, along the rearward edge 324 there is formed a strengthening L-shaped configuration having a vertically extending leg 332 and a horizontally extending leg 334. A locking screw 340 is secured to the compass support member 276 near the lateral extremity thereof and threadedly engages a wing nut 342. THe compass slide bar 274 is a generally flat member having a horizontally extending web surface 346 and a small vertically extending flange 348 which strengthens compass slide bar 274 and extends vertically upward from the inward or righthand edge thereof. The web surface 346 of compass slide bar 274 is pivotally secured at a rearward end thereof to a laterally outward end of the guide support member 272 by a pivot screw 350 and an associated self-locking nut 352 which threadedly engages the pivot screw 350. Pivot screw 350 is recessed into the guide support member 272 to avoid interference with the guide member 270 as the guide member 270 is nested into guide support 272. The web surface 346 of compass slide bar 274 includes a longitudinally extending slot which receives the locking screw 340. By suitably positioning the locking screw 340 within the slot 354 the guide support arm 272 and hence guide arm 270 may be rotated to any desired position for providing a cut angle between −45° and +45° (45° to 135°). When rotated to the desired position, the position is secured by tightening the wing nut 342 onto locking screw 340. If desired, index marks 356 may be placed upon the top surface of web portion 346 of compass slide bar 274 in such a way that visual alignment with the forward edge 322 of compass support arm 276 will permit quick rotation of the compass support arm 272 to a rotational position providing a predetermined cutting angle. A spacer plate 334 prevents the vertical legs 332 frombeing flattened by the tightening force of wing nut 342.

Figure 7:
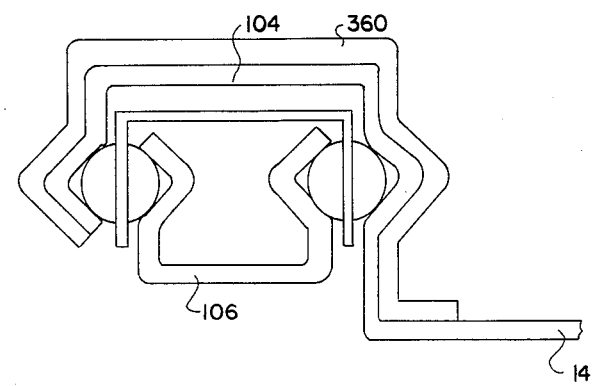
FIG. 7 is a simplified fragmentary rear view of an alternative embodiment of the self guiding power saw shown in FIG. 1 and illustrating a reinforced strap.
Figure 8:
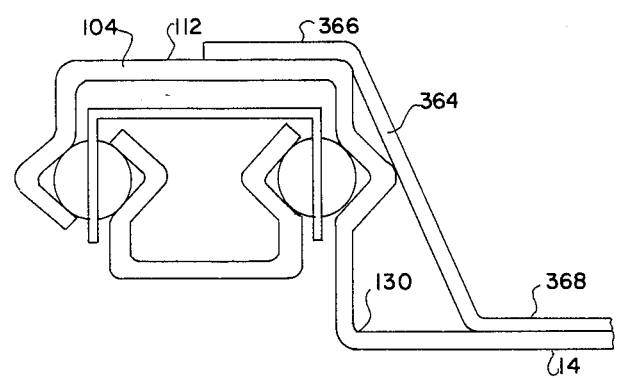
FIG. 8 is a simplified fragmentary rear view of another alternative embodiment of the self guiding power saw shown in FIG. 1 and illustrating a reinforcement bar.

For rugged, heavy duty applications, it may be desirable to strengthen the outer track 104 against torsional bending against base plate 56. One arrangement for accomplishing this strengthening or reinforcement of the outer track 104 is shown in FIG. 7 which utilizes a reinforcement strap 360 which generally conforms in cross-sectional shape to the outside of outer track 104 and is secured thereto by suitable fastening such as rivets, screws or even welding. Alternatively, as shown in FIG. 8, the connection bend 130 which connects base plate 56 to outer track 104 and is perhaps the region which is most susceptible to bending stresses may be reinforced by one or more support bars 364 which extend between the top surface of web portion 112 of outer track 104 and the top surface of base plate 14 spaced somewhat from the connection bend 130. An upper end of support bar 364 terminates in a horizontally extending fastening portion 366 which is secured to web portion 112 by rivets, screws, welding or other suitable fastening means. The opposite, lower end of support bar 364 terminates in a horizontally extending fastening portion 368 which is secured to an upper surface of base plate 14 by rivets, screws, welding or other suitable fastening means. The support bar 364 provides a triangulation effect between the right hand side of outer track 104 and the base plate 14 to greatly reduce the bending forces on connection bend 130. In FIGS. 7 and 8 the end tabs which retain the ball bearings within the races 160, 162 have been omitted for clarity.

Referring now to FIG. 9, there is shown an alternative embodiment of a self guiding power saw 378 having a saw guide assembly 380 and a circular power saw 382. The saw guide assembly 380 includes a slide aassembly 16 and a guide assembly 18 substantially identical to the saw guide assembly 10 shown in FIG. 1. However, the circular power saw 382 has an axially aligned motor with the saw blade on the right hand side as is typical of power saws for consumer or home use. Saw guide assembly 380 also has a base plate assembly 384 which is similar to the base plate assembly 14 but with a few variations.

The base plate assembly 384 has a generally planar horizontally extending bottom surface 386 which is intended to rest upon a top surface of a workpiece in the place of a sole of the saw 382. Like the baes plate assembly 14, the base plate assembly 384 includes tabs 388, 390 and hold downs 392, 394 to engage a peripheral vertically extending flange on the sole plate of the saw 382 to firmly affix the sole plate and hence the saw 382 to a top generally planar surface 396 of the base plate assembly 384. In the present embodiment, a saw blade aperture 398 is placed in alignment with the saw blade aperture through the sole plate of saw 382 and hence is further spaced from the slide assembly 16 and is positioned closer to a right hand boundary of base plate assembly 384 than for the base plate assembly 14 shown in FIG. 1.

However, the principal difference between the base plate assembly 14 (FIG. 1) and the base plate assembly 384 (FIG. 9) is that instead of being integral with the outer track 104, the base plate assembly 384 is formed from a separate piece of sheet metal from outer track 104 and has aa generally vertically extending connector portion 402 which extends between the generally flat surfaces 386, 396 to a generally flat, horizontally extending fastener portion 404 which is secured to the top surface of web portion 112 of outer track 104 adjacent the rearward end thereof. The fastener portion 404 is secured by suitable fasteners 406 such as rivets, bolts, nuts, or welding. The fastener portion 406 receives and mounts the latching assembly 408 in substantially the same way as the web portion 112 receives and mounts the latching assembly 190 in the arrangement shown in FIG. 1.

A still further embodiment of a saw guide assembly for a self guiding power saw in accordance with the invention is represented in FIGS. 10, 11, 12 and 13 as a saw guide assembly 420 with the saw removed except for a fragmentary portion of the base plate 422. The saw guide assembly 420 is principally adapted for a commercial or industrial type of saw with the blade on the left hand side of the sole plate and hence has the saw blade receiving aperture 426 on the left hand side adjacent the slide assembly 16 which is similar to the slide assemblies in the arrangement shown in FIGS. 1 and 9. Like the saw guide assembly 384, saw guide assembly 420 is formed froma piece of sheet material separate from the material of outer slide 104 and has a fastening portion 406 securing the base plate assembly 420 to the web portion 112 of outer track 104. The embodiment shown in FIG. 10 differs from the privously described arrangements primarily in the employment of a highly advantageous quick release mounting system for securing the sole 422 of the power saw to the base plate assembly 420. Along the left hand edge of the base plate assembly 420 adjacent the slide assembly 16 a generally rectangular cross section locking bar 430 is secured above a top surface 432 of the base plate assembly 420 by a left side flange bar 434 which is approximately ⅛" thick by suitable fasteners 436 such as rivets, bolts, or welding. The locking bar 430 carries a front tabe 440 disposed near the forward end of the base plate assembly 420. The flange bar 434 has a vertically extending flaange 435 which is bent near the rearward end thereof to form a small horizontal extending rear tab 442 disposed near the rearward end of the base plate assembly 420. The tabs 440, 442 extend a short distance horizontally from the left hand side of the base plate assembly 420 toward the right hand side and are spaced approximately ⅛ inch and ¼ inch respectively above the top surface 432 of base plate assembly 420. The tab 440 is adapted to be matingly received by an aperture 444 in a vertically extending left flange 446 of a power saw sole plate as illustrated in the fragmentary view of sole plate 422 shown in FIG. 11. The aperture 444 is conventionally provided on the power saw sole plates at the forward end thereof for the purpose of receiving a rip guide (not shown). The tab 442 extends over the top of the sole plate flange in a manner analogous to the tabs 68 and 70 in FIG. 1. Alternatively, if the saw sole plate 422 has a rearward rip guide receiving aperture in the left side flange thereof the tab 442 can be formed like the tab 440.

Along the right hand edge of the sole plate as represented by fragmentary portion 422 in FIG. 10, a locking bar 448 is secured to the top surface 432 by suitable fasteners 450 such as rivets, bolts and nuts or welding. The locking bar 448 permits the right hand edge of the sole plate to be lifted away from the top surface 432 and then slid rightward to extract left hand sole plate flange from the tabs 440, 442 for removal of the power saw.

Similarly, to attach the power saw to the base plate assembly 420, the apertures 444 are aligned with the tab 440 and the sole plate is slid leftward until the aperture 444 matingly receives the tabs 440 and the left hand flange slips beneath tab 442. The right hand edge of the sole plate 422 is then lowered beside the locking bar 448 into contact with the top surface 432 of base plate 420. Next, two quick release hold down assemblies 452, 454 are secured by rotating a gripping member 456 into engagement with the top surface of a right hand vertically extending flange 460 of sole plate fragment 422 and then tightening a quick release locking nut 458 upon a threaded bolt or shaft 474 which is secured relatively to the top surface 432 base plate assembly 430 and extends vertically upward therefrom.

The hold down assembly 454 is illustrative of the assemblies 452, 454 and the gripping member 456 is shown in further detail in FIGS. 12 and 13 to which reference is now made.

It will be seen that gripping member 456 has a generally flat structure 470 which is generally circular with an eccentrically place hole 472 therethrough for receiving a fastening bolt (474 in FIG. 10).

Along the right hand edge of horizontal flat plate 470 there is formed a vertically extending flange 476 which extends rearwardly to provide a handle. Along the rearward edge of the circular portion of flat structure 470 there is formed a downwardly extending gripping tab 480 which assures that the gripping member 456 can tightly engage the flange 460 of a saw sole plate by extending below the bottom surface of the flat structure 470 to engage the flange 460.

It will be observed that the hold down assembly 452 is shown with the gripping member 456 rotated to the release position while the hold down assembly 454 is shown with the gripping member 456 rotated to the locking position wherein gripping tab 480 engages flange fabricated as conventional nuts with handles welded thereto.

The arrangment shown in FIGS. 10–13 thus has the advantage of a positive blocking or non-frictional hold down wherein the saw is mounted on the base plate in a manner which precludes frictional slippage. For example, on the left hand side the tab and mating hole locking feature positively prevents all degrees of motion except sliding to the right. On the right hand side the locking bar 448 positively locks rightward motion unless the saw is lifted upward. However, the hold downs 452, 454 engage the right hand flange 460 of the sole plate 422 and prevent upward motion thereof when in a locked position. It is thus impossible for the power saw to frictionally slip or slide relatively to the base plate assembly 420 as long as the hold down assemblies 452, 454 are in the locked position.

While there have been shown and described above particular arrangements of self guiding power saws and their saw guide assemblies for the purpose of teaching a person of ordinary skill in the art how to make and use the invention, it will be appreciated the the invention is not limited thereto. Accordingly, any modifications, variations, or equivalent arrangements within the scope of the attached claims should be considered to be within the scope of the invention.

What is claimed is:

1. A portable saw guide assembly for removably mounting a portable motor driven saw mounted on a generally flat sole plate having an aperture therethrough for receiving a saw blade, the saw guide assembly comprising:
   a generally planar base plate for receiving and removably mounting the sole plate of the saw, the base plate having a horizontally extending planar bottom surface, and an aperture therethrough which is generally coextensive with the aperture through the sole plate of a saw mounted thereon;
   a hold down mechanism for releasably securing the saw to the base plate;
   a longitudinally extending slide mechanism including:
      an outer track extending longitudinally between a forward end and a rearward end thereof and having a cross sectional shape generally conforming to an inverted U with a top web portion interconnecting two downwardly depending outer track side members, each outer track side member being formed to define first and second ball bearing engaging planar surfaces which are tangential to ball bearings at an angle of approximately 45 degrees relative to the horizontal and at an angle of approximately 90 degrees relative to each other, the outer track having a detent at each end thereof preventing a ball bearing assembly from escaping past the end, the outer track being fixedly secured to the base plate adjacent the rearward end of the outer track with the base plate being disposed on one side of the outer track,
      an inner track substantially equal in length to the outer track and extending longitudinally between forward and rearward ends thereof, the inner track being at least partially disposed within the outer track in a sliding mating relationship and having a cross sectional shape generally conforming to a U with a bottom web portion interconnecting two upwardly extending inner track side members, each inner track side member being formed to define third and fourth ball bearing engaging planar surfaces which are tangential to ball bearings at an angle of approximately 45 degrees relative to the horizontal, which are tangential to ball bearings at an angle of approximately 90 degrees relative to each other and which are in spaced apart opposed relationship to the first and second surfaces of a mating outer track side member, and a ball bearing assembly including a set of at least two ball bearings disposed between each mating pair of side members of the outer and inner tracks in engagement with the first, second, third and fourth surfaces thereof and a bearing guide that moves with the ball bearings and maintains each set of ball bearings in a selected, spaced relationship; and a guide assembly including a guide member having a pivot end pivotally secured to the inner track at a pivot point adjacent the rearward end thereof and a free end extending beyond a side of the outer track opposite the one side, the guide member having a horizontally extending portion having a bottom surface that is substantially coplanar with the bottom surface of the base plate and a vertically extending portion that depends vertically downward from a rearward edge of the horizontally extending portion, a compass support secured to the inner track longitudinally forward of the pivot point and extending beyond said opposite side of the outer track, and a compass arm having one end lsidably secured to the compass support to enable pivotable adjustment of the guide member relative to the inner track.

2. An anti-clogging telescoping saw guide for a hand held power saw for facilitating a desired cutting path through a workpiece at a variety of angles comprising:

a track assembly for guiding the saw through a cutting path comprising first and second elongated tracks, said first track having a first open end, a second open end, a substantially flat elongated bottom portion that overlies the workpiece, and corrugated sides extending upwardly from the bottom portion to define an inwardly formed channel, said second track overlying the first track and having a third open end and a fourth open end, the second track having a substantially flat top portion for attachment to a base plate assembly and corrugated sides extending downwardly from the top portion towards the first track to define an outwardly formed channel, the inwardly formed channel of the first track and the outwardly formed channel of the second track defining a race;

a plurality of ball bearings located in the race of the track assembly to allow the second track to telescope both forwards and backwards in relation to the first track, the race of the track assembly defining a four point contact with the ball bearings which prevents any clogging of the track assembly;

an elongated bearing guide between the first track and the second track of the track assembly, the bearing guide having an elongated flat portion that parallels the width of the top portion of the second track, the bearing guide further including an elongated first side and an elongated second side attached at right angles to the flat upper portion of the bearing guide, each side extending downwardly into a respective race defined by the first track and the second track, the first side and the second side of the bearing guide having at least two central apertures of sufficient diameter to retain a ball bearing therein, the bearing guide keeping the ball bearings separated by a predetermined distance to insure a smoth and stable cut;

a base plate assembly attached to the top portion of the second track of the track assembly, the base plate assembly having an integral mounting plate for the power saw to be mounted on that is laterally offset from the track assembly, said mounting plate having a top surface and a bottom surface, the bottom surface being in communication with the workpiece and the top surface being in communication with the saw and having means to secure a power saw thereto, said mounting plate also having a front side, a back side and a third side in relation to the track assembly, said third side being farthest away and opposite the track assembly, the third side abutting the front side and the back side, the mounting plate having positioned therein closest to the third side and between the front side and the back side an elonagted rectangular aperture of sufficient length and width to allow a cutting instrument direct access to the workpiece;

a compass support secured to the bottom portion of the first track of the track assembly and extending outwardly away from the base plate assembly, the compass support including a peg and a corresponding wing nut to receive and secure in place a compass arm;

a compass angle support pivotally attached to the bottom portion of the first track of the track assembly and extending outwardly away from the track assembly and the base plate assembly, the angle support having a straight elongated portion that communicates with the surface of the workpiece and a corresponding elongated back portion rotated 90° from and integral with the straight portion, the back portion communicating with an edge of the workpiece to provide a positive contact with the workpiece; and a compass arm pivotally attached to the compass angle support, the compass arm being a straight member having an inner elongated aperture extending at least half the length of the compass arm, the compass arm extending from the angle support to the compass support with the peg of the compass support extending up through the elongated aperture in the compass arm, the elongated aperture being fraduated to indicate a cutting angle relative to the workpiece that may be selected and secured by tightening the wing nut on the peg.

3. A saw guide assembly comprising:

a longitudinally extending, elongated inner track having a forward end and an opposite rearward end, telescopingly disposed at least partially within the outer track with both the rearward and the forward end being extensible beyond a corresponding end of the outer track;

a ball bearing assembly including a plurality of ball bearings disposed on each side of the inner and outer tracks between opposed members thereof to secure the inner and outer tracks in a longitudinally moveable relationship;

a base plate assembly including a generally planar base plate having a horizontally extending bottom surface lying in and defining a horizontally work engagement plane, the base plate being disposed on a first side of the inner and outer tracks with the work engagement plane being at least as low as a lowest extremity of the inner and outer tracks, the base plate being fixedly secured to a given one of the outer and inner tracks adjacent the rearward end thereof, and the base plate being adapted to mountingly receive and support a power saw, the base platae assembly further including first and second tabs disposed in spaced relation to each other and to the base plate adjacent an edge thereof and extending horizontally toward an opposite edge, a locking bar secured to the base plate opposite the first and second tabs in spaced relationship thereto, and at least one hold down assembly secured to the base plate adjacent a side of the locking bar facing the first and second tabs to selectively engage and clamp a saw to the base plate; and a guide assembly including an elongated, generally laterally extending guide member disposed on a side of the outer and inner tracks opposite the base plate with a pivot end pivotably attached adjacent the rearward end of the one of the outer and inner tracks that is not secured to the base plate, the guide member having a horizontally extending planar portion with a bottom surface lying int eh horizontal work engagement plane and a vertically extending surface depending downward from the horizontally extending planar portion.

4. A saw guide assembly comprising:

a longitudinally extending, elongated outer track having a forward end and an opposite rearward end;

a longitudinally extending, elongated inner track having a forward end and an opposite rearward end, telescopingly disposed at least partially within the outer track with both the rearward and the forward end being extensible beyond a corresponding end of the outer track;

a ball bearing assembly including a plurality of ball bearings disposed on each side of the inner and outer tracks between opposed members thereof to secure the inner and outer tracks in a longitudinally moveable relationship;

a base plate assembly including a generally planar base plate having a horizontally extending bottom surface lying in and defining a horizontal work engagement plane, the base plate being disposed on a first side of the inner and outer tracks with the work engagement plane being at least as low as a lowest extremity of the inner and outer tracks, the base plate being fixedly secured to a given one of the outer and inner tracks adjacent the rearward end thereof, and the base plate being adapted to mountingly receive and support a power saw;

a guide assembly including an elongated, generally laterally extending guide member disposed on a side of the outer and inner tracks opposite the base plate with a pivot end pivotably attached adjacent the rearward end of the one of the outer and inner tracks that is not secured to the base plate, the guide member having a horizontally extending planar portion with a bottom surface lying in the horizontal work engagement plane and a vertically extending surface depending downward from the horizontally extending planar portion, the guide assembly further including an elongated guide support member receiving the guide member in a nesting relationship, the guide support member to the rearward end of one of the outer and inner tracks that is not secured to the base plate, a latch assembly for releasably securing the guide member and a positioning mechanism for securing the guide support member in a selected position of rotation relative to the outer and inner tracks.

5. A saw guide assembly comprising:

a longitudinally extending, elongated outer track having a forward end and an opposite rearward end;

a longitudinally extending, elongated inner track having a forward end and an opposite rearward end, telescopingly disposed at least partially within the outer track with both the rearward and the forward end being extensible beyond a corresponding end of the outer track;

a ball bearing assembly including a plurality of ball bearings disposed one ach side of the inner and outer tracks between opposed members thereof to secure the inner and outer tracks in a longitudinally moveable relationship;

a base plate assembly including a generally planar base plate having a horizontally extending bottom surface lying in and defining a horizontal work engagement plane, the base plate being disposed on a first side of the inner and outer tracks with the work engagement plane being at least as low as a lowest extremity of the inner and outer tracks, the base plate being fixedly secured to a given one of the outer and inner tracks adjacent the rearward end thereof, and the base plate being adapted to mountingly receive and support a power saw;

a guide assembly including an elongated, generally laterally extending guide member disposed on a side of the outer and inner tracks opposite the base plate with a pivot end pivotably attached adjacent the rearward end of the one of the outer and inner tracks that is not secured to the base plate, the guide member having a horizontally extending planar portion with a bottom surface lying in the horizontal work engagement plane and a vertically extending surface depending downward from the horizontally extending planar portion, the guide assembly further including a generally "L" shaped elongated guide support arm that is shorter than the guide arm and has a pivot end pivotably attached to the one track along with the guide arm, and a free end opposite the pivot end extending to a same side of the one track as the guide member, a latch assembly selectively securing the guide arm to the guide support arm and a positioning mechanism connected to secure the guide support arm in a selected position of rotation relative to the one track.

6. A saw guide assembly according to claim 5 wherein the positioning mechanism includes a compass support arm secured to the one track longitudinally forward of the pivotal attachment of the guide support arm to the one track and extending laterally to the same side of the one track as the guide support arm and an elongated slide bar pivotally secured at one end to the guide support member and an opposite end extending at least to the compass support arm, the guide support arm being slidably secured to the compass support arm such that the guide support arm can be selectably rotated to produce a saw cut at any angle between plus and minus 45 degrees relative to a back surface of a workpiece.

7. A saw guide assembly according to claim 6 wherein the slide bar includes a longitudinally extending slot that is releasably secured to the compass support arm by a bolt passing through the slot and a nut.

8. A saw guide assembly comprising: a longitudinally extending, elongated outer track having a forward end and an opposite rearward end;
  a longitudinally extending, elongated inner track having a forward end and an opposite rearward end, telescopingly disposed at least partially within the outer track;
  a ball bearing assembly including a plurality of ball bearings disposed on each side of the inner and outer tracks between opposed members thereof to secure the inner and outer tracks in a longitudinally moveable relationship;
  a base plate assembly including a generally planar base plate having a horizontally extending bottom surface lying in and defining a horizontal workpiece engagement plane, the base plate being disposed on a first side of the inner and outer tracks with the work engagement plane being at least as low as a lowest extremity of the inner and outer tracks, the base plate being fixedly secured to a given one of the outer and inner tracks adjacent the rearward end thereof, and the base plate being adapted to mountingly receive and support a power saw;
  a guide assembly including an elongated, generally laterally extending guide member disposed on a side of the outer and inner tracks opposite the base plate with a pivot end pivotably attached adjacent the rearward end of the one of the outer and inner tracks that is different from the given track, the guide member having a horizontally extending planar portion with a bottom surface lying in the horizontal workpiece engagement plane and a vertically extending surface depending downward from the horizontally extending planar portion, the guide assembly further including a compass support arm secured to the different track at a point forward of the point of attachment of the guide member with a bottom surface lying in the horizontal workpiece engagement plane and a slide bar adjustably coupled between that guide member and the compass support arm.

9. A saw guide assembly comprising:
  a longitudinally extending, elongated outer track having a forward end and an opposite rearward end;
  a longitudinally extending, elongated inner track having a forward end and an opposite rearward end, telescopingly disposed at least partially within the outer track;
  a ball bearing assembly including a plurality of ball bearings disposed on each side of the inner and outer tracks between opposed members thereof to secure the inner and outer tracks in a longitudinally moveable relationship;
  a base plate assembly including a generally planar base plate having a horizontal workpiece engagement plane, the base plate being disposed on a first side of the inner and outer tracks with the work engagement plane being at least as low as a lowest extremity of the inner and outer tracks, the base plate being fixedly secured to a given one of the outer and inner tracks adjacent the rearward end thereof, and the base plate being adapted to mountingly receive and support a power saw;
  a guide assembly including an elongated, generally laterally extending guide member disposed on a side of the outer and inner tracks opposite the base plate with a pivot end pivotably attached adjacent the rearward end of the one of the outer and inner tracks that is different from the given track, the guide member having a horizontally extending planar portion with a bottom surface lying in the horizontal workpiece engagement plane and a vertically extending surface depending downward from the horizontally extending planar portion, a guide support member that is shorter than the guide member, that is adapted to receive the guide member in a nesting relationship, that is disposed between the guide member and the different track at a pivot end, that is pivotally secured to the different track along with the guide member, a compass support arm connected to the different track forward of the guide member and guide support member connection to the different track and a slide bar adjustably connected between the compass support arm and the guide support arm to selectively angularly position the guide support arm relative to the tracks, the guide arm being pivotable between a retracted position generally parallel to the inner and outer tracks and a deployed position at which the guide arm in nested against the guide support arm.

10. A saw guide assembly comprising:
  a longitudinally extending, elongated outer track formed from a single, integral piece of sheet material having a web portion defining an upper surface of the outer track, two side members depending downwardly from opposite sides of the web portion, a forward end and an opposite rearward end;
  a longitudinally extending, elongated inner track having a web portion lying in and defining a workpiece engagement plane as well as a lower surface of the inner track, two side members extending upwardly from opposite sides of the inner track web portion, a forward end and an opposite rearward end, the inner track being telescopingly disposed at least partially within the outer track with both the rearward end and the forward end of the inner track being extensible beyond a corresponding end of the outer track;
  a ball bearing assembly including a plurality of ball bearings disposed on each side of the inner and outer tracks between opposed members thereof to secure the inner and outer tracks in a longitudinally moveable relationship;
  a base plate assembly including a generally planar base plate having a horizontally extending bottom surface lying in and defining the horizontal workpiece engagement plane, the base plate being disposed on a first side of the inner and outer tracks with the work engagement plane being at least as low as a lowest extremity of the inner and outer tracks, the base plate being formed integrally with the sheet material of track adjacent the rearward end thereof, having an aperture through the bottom surface with the bottom surface extending on both sides of the aperture in a direction perpendicular to the longitudinal direction and being adapted to mountingly receive and support a power saw having a blade extending through the aperture for cutting engagement with a workpiece;
  a guide assembly including an elongated, generally laterally extending guide member disposed on a side of the outer and inner tracks opposite the base plate with a pivot end pivotably attached adjacent the rearward end of the one of the outer and inner tracks that is not secured to the base plate, the guide member having a horizontally extending planar portion with a bottom surface lying in the horizontal workpiece engagement plane and a vertically extending surface depending downward from the horizontally extending planar portion.

11. A saw guide assembly according to claim 10 wherein the outer track and the base plate are formed from a single, integral piece of sheet metal.

12. A saw guide assembly according to claim 11 wherein the sheet metal is 12 gauge 5086 Megalloy aluminum alloy and both the inner and outer tracks are formed from the same material.

13. A saw guide assembly according to claim 10, wherein the base plate is adapted to releasably receive and mount a power saw having a sole plate and including means for securing a power saw sole plate to the base plate.

14. A saw guide assembly according to claim 10 further comprising a power saw secured to and supported by the base plate.

15. A saw guide assembly according to claim 14 wherein the sheet material is 12 gauge 5086 Megalloy aluminum alloy.

16. A saw guide assembly according to claim 10 wherein the outer track has two spaced apart downwardly depending sidewalls, each having a downwardly depending longitudinally extending vertical segment, an upper longitudinally extending planar race segment which depends downwardly and outwardly from the vertical segment and a lower longitudinally extending planar race segment which depends downwardly and inwardly from the upper race segment,
wherein the inner track has two spaced apart upwardly extending sidewalls disposed between the outer track sidewalls, each inner track sidewall having an upwardly extending, longitudinally extending vertical segment, a lower longitudinally extending planar race segment which extends upwardly and inwardly from the vertical segment and an upper longitudinally extending planar race segment, and
wherein the race segments of each adjacent outer track wall and inner track wall pair define a race for receiving and retaining the ball bearings disposed on that side of the tracks to provide a smooth telescoping relative motion between the outer and the inner track while rigidly precluding all other relative motion between the outer and inner tracks.

17. A saw guide assembly according to claim 10 wherein the outer track, inner track and horizontally extending bottom surface of the base plate comprise 12 gauge aluminum alloy.

18. A saw guide assembly according to claim 10 wherein the ball bearings each make an instantaneous two point contact with a side of the outer track and with a corresponding side of the inner track.

19. A saw guide assembly according to claim 10 wherein the ball bearings each define two lines of contact with a sidewall of the outer track and two lines of contact with a corresponding side wall of the inner track as the outer and inner tracks undergo relative longitudinal motion.

20. A saw guide assembly according to claim 10 wherein the outer track has two opposed spaced apart longitudinally extending sidewalls, each having a 45° bend and an adjacent 90° bend to define two longitudinally extending adjacent planar surfaces which lie at an angle of 90° relative to one another and at an angle of 45° relative to a horizontal plane;
wherein the inner track has two opposed, spaced apart longitudinally extending sidewalls, each having a 45° bend and an adjacent 90° bend to define two longitudinally extending adjacent planar surfaces which lie at an angle of 90° relative to one another and at an angle of 45° relative to a horizontal plane, each inner track side wall surface being disposed in opposed relationship to a corresponding outer track side wall surface so that four side wall surfaces formed by each outer track sidewall and an adjacent inner track sidewall defines a bearing race with each of the four surfaces defining the race making a line of contact with each ball bearing rolling within the race as the outer and inner tracks are telescopingly moved relative to one another; and
wherein the ball bearing assembly includes a bearing guide having a central web portion extending between the races on opposite sides of the inner and outer racks and two depending portions each extending into a different race on opposite sides of the web portion and constraining the bearings to a predetermined spaced apart relationship in which each bearing in each race is matched by an opposite bearing in the other race.

21. A saw guide assembly according to claim 10 wherein the ouer track has two downwardly depending spaced apart side walls, wherein the inner track has two upwardly extending spaced apart side walls disposed at least partially between the sidewalls of the outer track; wherein each outer sidewall cooperates with an adjacent inner sidewall to define a race having two pairs of spaced apart planar, longitudinally extending surfaces that are in parallel opposed relationship to one another, the race receiving at least two ball bearings from the ball bearing assembly and engaging each along a line of contact for each of the two pairs of race defining surfaces as the outer and inner tracks are longitudinally moved relative to one another; and further including a bearing guide extending into the races defined between the inner and outer tracks to maintain the bearings in spaced relationship with respect to other bearings in the same race and in opposed pair relationship with respect to bearings in the other race.

22. A saw guide assembly according to claim 10 wherein the base plate assembly includes a pair of spaced apart hold down assemblies for securing a sole plate of a power saw to the base plate, each hold down assembly including an upwardly projecting threaded bolt; a gripping member having an aperture for slidingly receiving the bolt, an eccentric gripping tab that is movable between an engaging locking positio and a nonengaging release position relative to a sole plate of a saw positioned on the base plate and a support flange disposed on a side of the bolt opposite the gripping tab to bear against the base plate and maintain the gripping tab in an approximately horizontal plane; and a locking nut threadedly engaging the bolt and, when tightened forcing the gripping tab into locking engagement with a sole plate of a saw and the support plate into engagement with the base plate.

23. A saw guide assembly according to claim 22 wherein the locking nut includes an elongated handle extending therefrom.

24. A saw guide assembly comprising:

a longitudinally extending, elongated outer track having a forward end and an opposite rearward end;

a longitudinally extending, elongated inner track having a forward end and an opposite rearward end, telescopingly disposed at least partially within the outer track with both the rearward and the forward end being extensible beyond a corresponding end of the outer track;

a ball bearing assembly including a plurality of ball bearings disposed on each side of the inner and outer tracks between opposed members thereof to secure the inner and outer tracks in a longitudinaly moveable relationship;

a base plate assembly including a generally planar base plate having a horizontally extending bottom surface lying in and defining a horizontal work engagement plane, the base plate being disposed on a first side of the inner and outer tracks with the work engagement plane being at least as low as a lowest extremity of the inner and outer tracks, the base plate being fixedly secured to a given one of the outer and inner tracks adjacent the rearward end thereof, and the base plate being adapted to mountingly receive and support a power saw and including upwardly extending flanges on a rearward edge and a first longitudinally extending edge for matingly receiving and supporting corresponding edges of a power saw sole plate, a pair of tabs spaced apart along the longitudinal edge, each extending horizontally toward the center of the base plate to prevent vertical motion of a power saw sole plate and at least one releasable hold down mechanism positioned on a side of the base plate opposite the first edge to secure a power saw sole plate to the base plate;

a guide assembly including an elongated, generally laterally extending guide member disposed on a side of the outer and inner tracks opposite the base plate with a pivot end pivotably attached adjacent the rearward end of the one of the outer and inner tracks that is not secured to the base plate, the guide member having a horizontally extending planar portion with a bottom surface lying in the horizontal work engagement plane and a vertically extending surface depending downward from the horizontally extending planar portion.

25. A saw guide assembly comprising:
a longitudinally extending, elongated outer track having a forward end and an opposite rearward end;

a longitudinally extending, elongated inner track having a forward end and an opposite rearward end, telescopingly disposed at least partially within the outer track with both the rearward and the forward end being extensible beyond a corresponding end of the outer track;

a ball bearing assembly including a plurality of ball bearings disposed on each side of the inner and outer tracks between opposed members thereof to secure the inner and outer tracks in a longitudinally moveable relationship;

a base plate assembly including a generally planar base plate having a horizontally extending bottom surface lying in and defining a horizontal work engagement plane, the base plate being disposed on a first side of the inner and outer tracks with the work engagement plane being at least as low as a lowest extremity of the inner and outer tracks, the base plate being fixedly secured to a given one of the outer and inner tracks adjacent the rearward end thereof, and the base plate being adapted to mountingly receive and support a power saw; and a guide assembly including a guide support member and a guide member that are each pivotally coupled adjacent a pivot end thereof to a rearward end of the one of the outer and inner tracks that is different from the given track with the guide member being nestable within the guide support member and pivotable to a retracted position at which the guide member extends generally parallel to the inner and outer tracks, the guide support member being adjustably positionable at a selected angle relative to the inner and outer tracks.

26. A saw guide assembly according to claim 25 wherein the guide assembly includes a latch for releasable securing the guide member to the guide support member when the guide member is nested within the guide support member.

27. A saw guide assembly according to claim 25 wherein the guide member has an angle shape adapted to secure the angle member against top and edge surfaces of a workpiece.

* * * * *

UNITED STATES PATENT AND TRADEMARK OFFICE
CERTIFICATE OF CORRECTION

PATENT NO. : 4,751,865

DATED : June 21, 1988

INVENTOR(S) : Joseph A. Buckalew

Page 1 of 3

It is certified that error appears in the above-identified patent and that said Letters Patent is hereby corrected as shown below:

Cover page, under "[56] References Cited", "Mitchel" should read --Mitchell--.
Cover page, under "[56] References Cited", "3,991,642" should read --3,991,643--.
Column 1, line 19, "made" should read --make--.
Column 1, line 20, "rotatable" should read --repeatable--.
Column 1, line 63, "hasa not" should read --has no--.
Column 4, line 20, "assemlby" should read --assembly--.
Column 5, line 43, ". the" should read --. The--.
Column 5, line 45, "rivotting" should read --riveting--.
Column 6, line 24, "baase" should read --base--.
Column 6, line 36, "left and" should read --left hand--.
Column 6, line 59, "o" should read --of--.
Column 6, line 63, "thentightened" should read --then tightened--.
Column 7, line 8, "asa" should read --as--.
Column 8, line 33, "sectios" should read --sections--.
Column 8, line 36, "saw dust" should read --sawdust--.
Column 9, line 5, "advantagesouly" should read --advantageously--.
Column 9, line 35, "thelongitudinally" should read --the longitudinally--.
Column 9, line 61, "angles" should read --angled--.
Column 10, line 8, "rivtes" should read --rivets--.
Column 10, line 8, "fastneing" should read --fastening--.
Column 10, line 23, "lateral" should read --laterally--.
Column 10, line 45, "latch member 2060" should read --latch member 206--.
Column 10, line 51, "torotate" should read --to rotate--.
Column 10, line 51, "teh" should read --the--.

UNITED STATES PATENT AND TRADEMARK OFFICE
CERTIFICATE OF CORRECTION

PATENT NO. : 4,751,865              Page 2 of 3

DATED : June 21, 1988

INVENTOR(S) : Joseph A. Buckalew

It is certified that error appears in the above-identified patent and that said Letters Patent is hereby corrected as shown below:

```
Column 11, line 2, "inner track 1060" should read
  --inner track 106--.
Column 11, line 16, after "latch" and before "assembly",
  insert --member 206.  This enables the operator to unlatch
  the latch--.
Column 11, line 29, "exetnds" should read --extends--.
Column 12, line 17, "extend" should read --extent--.
Column 12, line 26, "extend" should read --extent--.
Column 12, line 43, "sufficienty" should read --sufficiently--.
Column 13, line 27, "frombeing" should read --from being--.
Column 14, line 16, after "hand" and before "boundary"
  insert --vertically extending flange 400 which defines the
  right hand--.
Column 14, line 24, "aa" should read --a--.
Column 14, line 48, "froma" should read --from a--.
Column 14, line 52, "privously" should read --previously--.
Column 14, line 64, "flaange" should read --flange--
Column 16, line 15, "the" (second occurrence) should read
  --that--.
Column 17, line 25, before "lsidably" insert --pivotally
  coupled to the guide member and an opposite slide end--.
Column 17, line 25, "lsidably" should read --slidably--.
Column 17, line 68, "smoth" should read --smooth--.
Column 18, line 45, "fraduated" should read --graduated--.
Column 18, after line 48 "3.  A saw guide assembly comprising:",
  insert the paragraph --a longitudinally extending, elongated
  outer track having a forward end and an opposite rearward
  end;--.
Column 19, line 21, "int eh" should read --in the--.
```

UNITED STATES PATENT AND TRADEMARK OFFICE
CERTIFICATE OF CORRECTION

PATENT NO. : 4,751,865

DATED : June 21, 1988

INVENTOR(S) : Joseph A. Buckalew

It is certified that error appears in the above-identified patent and that said Letters Patent is hereby corrected as shown below:

```
Column 19, line 64, after "member" and before "to", insert
 --having a pivot end pivotably attached along with the
 guide member--.
Column 20, line 14, "one ach" should read --one each--.
Column 22, line 57, after "of" and before "track",
 insert --the outer--.
Column 23, line 43, after "ment", and before the "," (comma),
 insert --which extends upwardly and outwardly from the lower
 race segment--.
Column 24, line 55, "positio" should read --position--.
```

Signed and Sealed this

Twenty-seventh Day of June, 1989

Attest:

DONALD J. QUIGG

*Attesting Officer*    Commissioner of Patents and Trademarks